May 12, 1936.  D. O. DRUGE ET AL  2,040,299
TIRE INFLATER AND GAUGE
Filed Sept. 4, 1931
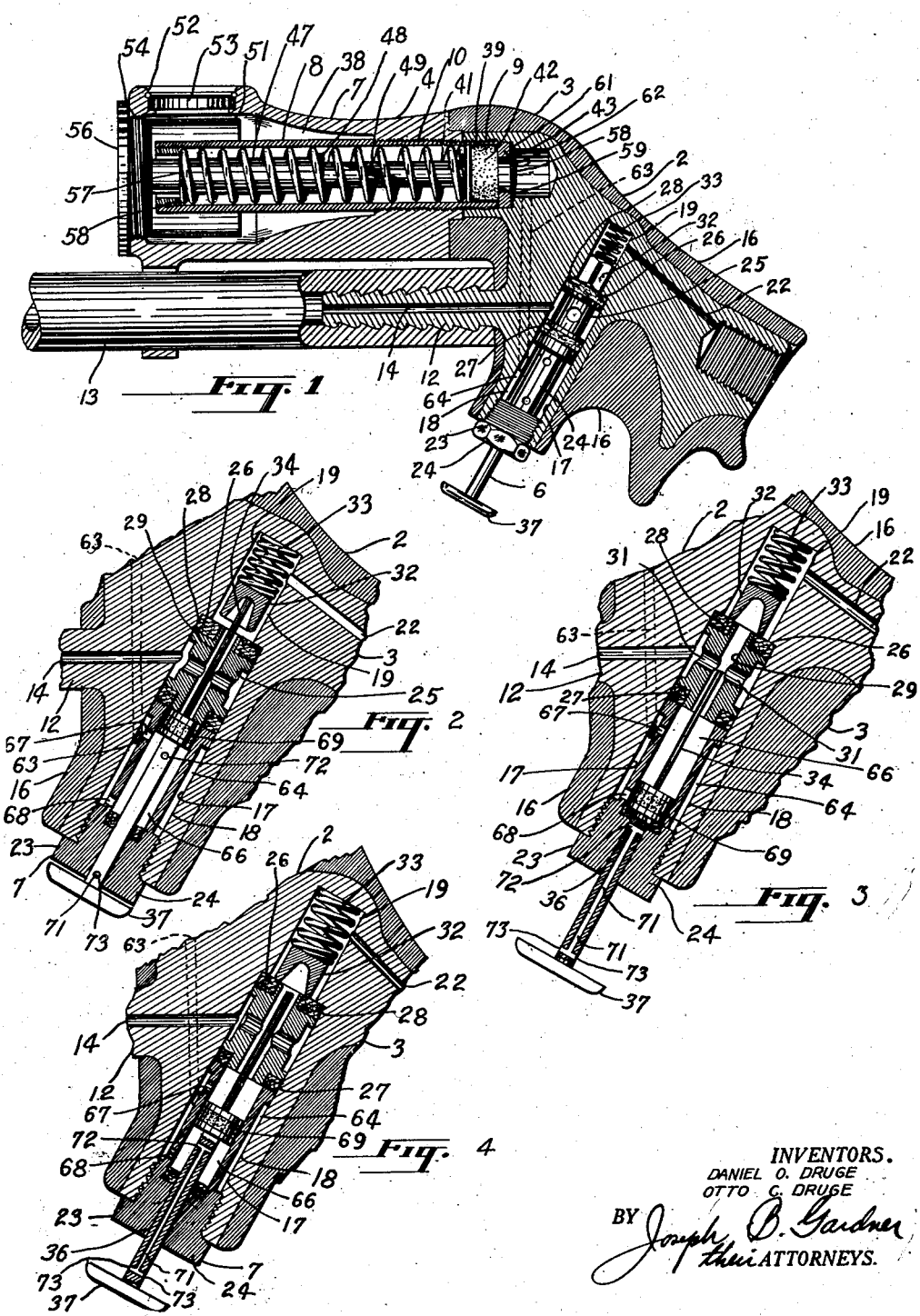
INVENTORS.
DANIEL O. DRUGE
OTTO C. DRUGE
BY Joseph B. Gardner
their ATTORNEYS.

Patented May 12, 1936

2,040,299

UNITED STATES PATENT OFFICE 2,040,299

TIRE INFLATER AND GAUGE

Daniel O. Druge and Otto C. Druge, Oakland, Calif.

Application September 4, 1931, Serial No. 561,100

2 Claims. (Cl. 277—20)

The invention relates in general to equipment for inflating and determining the air pressure within pneumatic tires and other inflatable objects, and in particular has to do with improvements in such equipment of the type wherein the air filling hose and pressure gauge are combined in a single unitary device arranged to be carried at and operatively connected to the outlet terminal of the hose.

An object of the invention is to provide a combined inflater and gauge of the character described which may be utilized when operatively connected with the tire for deflating as well as inflating the tire, or to successively perform such operations without disconnecting the device from the tire, and to give a reading of the pressure after deflation as well as after inflation.

Another object of the invention is to provide a device of the character described in which the strain on the tire connecting hose caused by sudden surge of back pressure on the abrupt cutting off of the air supply will be reduced to a minimum.

A further object of the invention is to provide a device of the character described, in which the initial fluctuation of the indicated pressure caused by the sudden application of relatively high pressure on the gauging mechanism will be avoided.

A still further object of the invention is to provide a device of the character described in which all the parts thereof may be manufactured at low cost and assembled in a simple but effective manner.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of the device of our invention.

Figure 2 is a fragmentary sectional view of the control portion of the device showing the parts in deflating position.

Figures 3 and 4 are views similar to Figure 2, but respectively showing the parts in gauging and deflating positions.

As illustrated in the drawing, the device of our invention comprises a body 2 preferably formed of sections 3 and 4 respectively containing the air control mechanism 6 and the gauging mechanism 7. The sections are conveniently secured together by means of an exteriorly threaded cylinder 8 which forms a part of the gauging mechanism and is engaged in the interiorly threaded portions 9 and 10 of the respective sections. An extension 12 of the body section 3 preferably extending parallel to the cylinder and section 4 provides a nipple with which a suitable conduit such as the flexible hose 13 may be attached for establishing operative communication between the intake opening of the tire (not shown) and a passage 14 of the section, through which air to or from the tire may pass. The section 3, as clearly shown in Figure 1, is preferably encased in a protective covering 16 of rubber or the like and is in general of such form that it may be readily gripped by the operator for control of the device with one hand while the other hand is utilized for holding the hose 13 to the tire intake opening.

As previously stated the body section 3 serves to contain the air control mechanism of the device and is formed with a main bore 17 comprising portions 18 and 19 respectively and conveniently termed an outer portion and inner portion. The bore is interposed between the passage 14 and an air intake passage 22 which is to be attached to a hose or the like for operative connection with a suitable source of air under pressure. The bore portion 18 is of larger diameter than the portion 19 and has inserted therein a plug 23 here shown formed of two parts 24 and 25, the latter part 25 being disposed inwardly of the part 24 and held in position against the inner end wall 26 of bore 18 by means of the part 24 which has a screw threaded engagement with the section 3. Preferably the opposite ends of the plug part 25 are provided with gaskets 27 and 28 whereby an air tight joint may be had between the parts and the wall 26. Formed in the plug part 25 is a passage 29 and branches 31 which communicate with bore portion 19 and the passage 14, the former it being noted is in direct communication with inlet passage 22.

Closing of communication between the passages 22 and 29 is arranged to be effected by means of a valve 32 which is designed to seat on the gasket 28, a spring 33 over the valve serving to resiliently retain the valve in closed position. Displacement of the valve 32 for opening the passage 29 and thereby permitting the air under pressure to be forced into the tire, may be effected by means of a stem 34 which extends completely through the plug and is conveniently disposed in the passage 29. The outer end portion of the stem slidably fits in a bearing 36 formed in the outer end portion of the plug while the inner end of the stem is arranged to contact with the valve. Movement of the stem against the action of spring 33 and the pressure of the air in passage 22 may be accomplished by pressing inwardly on a button 37 on the outer extremity of the stem.

The gauging mechanism in the present embodiment of the invention includes the previously referred to cylinder 8, which is disposed in a bore 38 and has contained therein a plunger 39. The latter comprises a spindle 41 and a piston 42 preferably in the form of a leather cup washer and normally held against an open plate 43 fixedly held in slightly spaced relation from the inner end of the bore. The plunger 39 is suitably held against rotative displacement and has mounted on the spindle 41 a telescoping sleeve 47 which is suitably held against longitudinal displacement on the spindle but is caused to rotate thereon upon the longitudinal displacement of the plunger. As here shown, rotation of the sleeve is caused by engagement of a pin 48 thereof in a spiral groove 49 formed on the spindle. Secured to the sleeve is an annular band 51 which surrounds the cylinder 8 and has provided on the exterior face thereof suitable graduations in terms of pressure units. Reading of the pressure is permitted through an opening 52 formed in the section 4 over the band, a gauge glass 53 being set in the opening to close same. Access to the bore 38 is afforded through the open end 54 of section 4 which is closed by a screw plug 56.

It will be understood that inward displacement of the plunger and the consequent rotation of the band 51 is arranged to be effected in accordance with the pressure exerted against the end of the piston, said inward displacement being resisted as here shown by a spring 57 encircling the sleeve and spindle and interposed between the piston and a stop 58 fixed in the outer end of the cylinder 8. Introduction of air into the cylinder and against the end of the piston is by way of an extremely small opening 58 formed in a disc 59 positioned at one side of the plate 43, it being noted that the plate and disc are fixedly held by the cylinder 8 against a shoulder 61 defined by the reduced portion 62 of the bore at the inner end thereof. Communication between the bore portion 62 and the bore 18 is afforded through means of a passage 63 extending therebetween. The plug section 24 is reduced about its middle portion so as to provide within the bore 18 an annular space 64 which connects with the passage 63, and said section is formed on the interior thereof with a cylindrical bore 66 which to some extent forms a continuation of the passage 29 and communicates with the space 64 by means of spaced ports 67 and 68. Operatively engaging the walls of the bore 66 and fixedly secured to the stem 34 is a piston 69 which is arranged in different positions of the stem to cover the ports 67 or 68.

When, as shown in Figures 3 and 4, the piston 69 is below the port 67, air may pass from passage 29 through said port to passage 63, and on the other hand when the piston is above said port as shown in Figure 2, communication between the passages 29 and 63 is cut off. Formed in the portion of the stem between the piston and the button 37 is a longitudinally extending passage 71 conveniently termed a deflating passage and having its inlet and outlet points 72 and 73 adjacent the extremities of such stem portion. When the piston, as shown in Figure 4, is above the port 68, the gauge passage 63 or the passage 29 may be in communication with the outlet or deflating passage 71 thereby making it possible to discharge through the latter any excess in the gauge or the tire, as will be more fully hereinafter explained.

In the operation of our device, assuming that the latter is operatively connected by way of passage 22 to a source of air under pressure, and connected through hose 13 to a pneumatic tire, to effect inflation of the tire, the operating button 37 is depressed to an extreme inward position as indicated in Figure 2. As a result of this positioning, the stem 34 will have raised the valve 32 off its seat whereby air from passage 22 may by way of passage 29 and branches 31 enter the air passage 14 for direct transmission to the tire, it being noted that with the valve 32 held off its seat by the stem, the piston 69 will have been raised to a position cutting off communication between passage 29 and gauge passage 63 or deflating passage 71 through either of the ports 67 and 68. It will thus be seen that as long as the button 37 is held depressed to effect inflation of the tire, no air may be directed to the gauge mechanism or permitted to escape through the deflating means. Should it now, or in fact at any time, be desired to measure the pressure in the tire, the hose 13 is held in operative communication with the tire, and the button 37 released whereby the stem may assume its extreme outward position as shown in Figure 3. With the stem thus positioned, the valve 32 will have returned to its seat and the piston 69 moved below port 67 and opposite port 68 whereby discharge of air through the deflating passage is still prevented but air from passage 14 may back up into gauge passage 63 by way of passage 29 and port 68 so that plunger 39 may be moved inwardly to effect the rotation of the band and the pressure indication. It is important to note that due to the relatively extremely small size of the aperture 58 which controls the admission of air to the gauge cylinder, the fluctuation of the gauge caused by the sudden surge of air pressure in the passage 63 and the resultant excessive movement of the plunger, will be avoided, since by the use of such aperture the flow of air to the cylinder is sufficiently restricted to cause a comparatively gradual filling and a steady movement of the plunger. It has been found in practice that with the gauge cylinder about one-half an inch in diameter, the aperture should be about .015 of an inch in diameter. After the pressure reading has been completed, the bottom may be depressed sufficiently to cause the piston 69 to uncover the port 68, thereby allowing the air to pass out through passage 71 and relieving the pressure in the gauge mechanism.

Should it at any time become desirable to deflate the tire, it is merely necessary to maintain the tire in open communication with passage 14 so that the air in the tire will back into the passage 29, and then depress the button about one half way in, so that the piston 69 will lie between the ports 67 and 68 as shown in Figure 4. With the piston thus disposed air from passage 14 may pass into passage 29 and thence into port 67 and out port 68 to finally discharge in the atmosphere through the deflation passage 71.

It will now be clear that the device of our invention is well adapted to the accomplishment of the hereinabove mentioned objects.

We claim:

1. In an air inflater mechanism arranged for connection with a source of air under pressure and a tire and a gauge and arranged to selectively connect said tire to said source or said gauge or to the atmosphere, a body having a bore open at one end, a plug inserted therein and comprising inner and outer sections respectively provided with an air control passage and a piston bore in alignment and communication, an air supply passage arranged for connection to said source and to said body bore adjacent its inner extremity, a valve normally closing said control passage and interposed between the latter and the supply passage, an air discharge passage arranged for connection to said tire and in continuous communication with said control passage, a passage exteriorly of and extending longitudinally with the piston bore and communicating therewith at spaced points adjacent the extremities of the bore, a passage in continuous communication with said last passage and arranged for connection with said gauge, a hand operated stem extending through said outer plug section and through said piston bore and control passage for unseating said valve, a piston on said stem to close communication between said control passage and the piston bore and between said bore and said exteriorly disposed passage at the points of communication thereof with the bore, and a passage in said stem opening to the atmosphere outside of said plug for placing the piston bore in communication with the atmosphere.

2. In a tire inflater mechanism arranged for connection with a source of air under pressure and a tire and a gauge and arranged to selectively connect said tire to said source or said gauge or to the atmosphere, a body having a bore opening to a side of the body, a tubular member inserted in said bore and having a passageway therethrough with a portion of the periphery of said member spaced from the wall of said bore and forming therewith a passage, said member having a port connecting said passageway and passage, a piston slidably mounted in said passageway and movable to cover and uncover said port, a passage communicating with said first passage and arranged for connection to said gauge, air inlet and discharge passages communicating with said passageway and arranged for connection with said source and tire respectively, valve means movable for permitting or stopping communication of said inlet passage and said passageway, and means manually controlled for moving said piston and valve means and providing in one position thereof venting of said passageway to the atmosphere.

DANIEL O. DRUGE.
OTTO C. DRUGE.